United States Patent [19]
Dale

[11] 3,913,794
[45] Oct. 21, 1975

[54] AMBULANT FEED DISPENSER HAVING ANGULARLY DISPOSED AUGER

[76] Inventor: Frank L. Dale, 210 N. Philadelphia, Coldwater, Kans. 67029

[22] Filed: Oct. 29, 1973

[21] Appl. No.: 410,545

[52] U.S. Cl. .............. 222/178; 222/413; 222/528
[51] Int. Cl.² ............................................ B67D 5/30
[58] Field of Search ............ 222/178, 413, 528, 564

[56] References Cited
UNITED STATES PATENTS

| | | | |
|---|---|---|---|
| 824,297 | 6/1906 | Hopkins et al. | 222/528 X |
| 3,135,430 | 6/1964 | Caldwell | 222/413 X |
| 3,361,302 | 1/1968 | Berger | 222/413 X |
| 3,439,819 | 4/1969 | Quanbeck | 222/413 X |
| 3,659,747 | 5/1972 | Teichgraeber | 222/178 X |
| 3,726,441 | 4/1973 | Keyes et al. | 222/178 |

Primary Examiner—Robert B. Reeves
Assistant Examiner—David A. Scherbel
Attorney, Agent, or Firm—John H. Widdowson

[57] ABSTRACT

A feed dispenser has a hopper mountable on a wheeled vehicle. A powered auger is mounted in the hopper. A discharge conduit has the outlet positioned to discharge material into a track of the wheeled vehicle when in use.

3 Claims, 4 Drawing Figures

AMBULANT FEED DISPENSER HAVING ANGULARLY DISPOSED AUGER

BACKGROUND OF THE INVENTION

The feed dispenser of this invention is related to dispensing of particulate composition cattle feed or the like in the field from a bulk feed storage container. Numerous types of cattle feed dispensing devices are known in the prior art as operable to move particulate material, such as cattle cubes or pelletized cattle feed or other particulate material from a hopper through a conduit for the discharge of same for feeding animals. However, the prior art devices are constructed specifically for discharging feed or other material directly behind the center portion of a vehicle on which the container is mounted or discharging material through a conduit to a point a substantial distance to the side of the container for filling feed bunks, troughs, or the like. During times of winter weather when snow is on the ground, it is extremely difficult to feed cattle using the prior art devices because of the following reasons: First, feed bunks may at times become filled with snow, ice, or other slushy liquid matter and become unusable because depositing cattle feed in them would be wasteful if not impossible. Second, using these prior art dispensing devices to drop the feed directly on the ground on top of the snow cover in the field is unsatisfactory because wind will blow the feed spreading it in the surrounding area before the cattle can eat it. Feeding of cattle during winter when there is snow cover on the ground presents a particularly critical problem because of the need to feed cattle at such times and the aforementioned problems involved with prior art feed dispensing devices.

SUMMARY OF THE INVENTION

In one preferred specific embodiment, a feed dispenser apparatus for the dispensing of range pellet or cubes is provided which includes a hopper which is mountable on a wheeled vehicle, an auger mounted in a lower portion of the hopper, a discharge conduit from the outlet of the hopper to discharge the feed material into a track of the wheeled vehicle at the rear of the vehicle when the dispenser is in use. The feed dispenser is particularly designed for feeding cattle on the range when there is snow cover on the ground. In use, feed is dispensed by the device into the snow packed track of a wheel of the vehicle on which the dispenser is mounted.

One object of this invention is to provide a range pellet or cube dispensing apparatus overcoming the aforementioned disadvantages of the prior art devices.

Another object of this invention is to provide a cattle feed dispenser apparatus having a hopper that is mountable on a wheeled vehicle and has an auger in a lower portion of the hopper to move material into a discharge conduit mounted with the hopper outlet for discharging the feed material into a track of a wheel of the vehicle at the rear of the vehicle.

Still, another object of this invention is to provide a feed dispenser for a vehicle having a hopper to store a quantity of range pellets, cubes, or other cattle feed material and having an auger mounted in the hopper to move the material into and through a discharge conduit wherein the discharge conduit has a flexible end portion terminating slightly above ground level behind a rear wheel of the vehicle to in use dispense the feed material into the track of the wheel in close proximity to the ground level.

Yet, one other object of this invention is to provide a feed dispenser apparatus for the feeding of cattle or the like which is mountable on a wheeled vehicle such as a trailer and having a powered auger mounted in a lower portion of the hopper to move material through a discharge conduit from the hopper for the dispensing of the feed material into the snow packed track of a wheel of the vehicle as the vehicle is pulled on snow-covered ground.

Various other objects, advantages, and features of the invention will become apparent to those skilled in the art from the following discussion, taken in conjunction with the accompanying drawings, in which:

Figure 1:
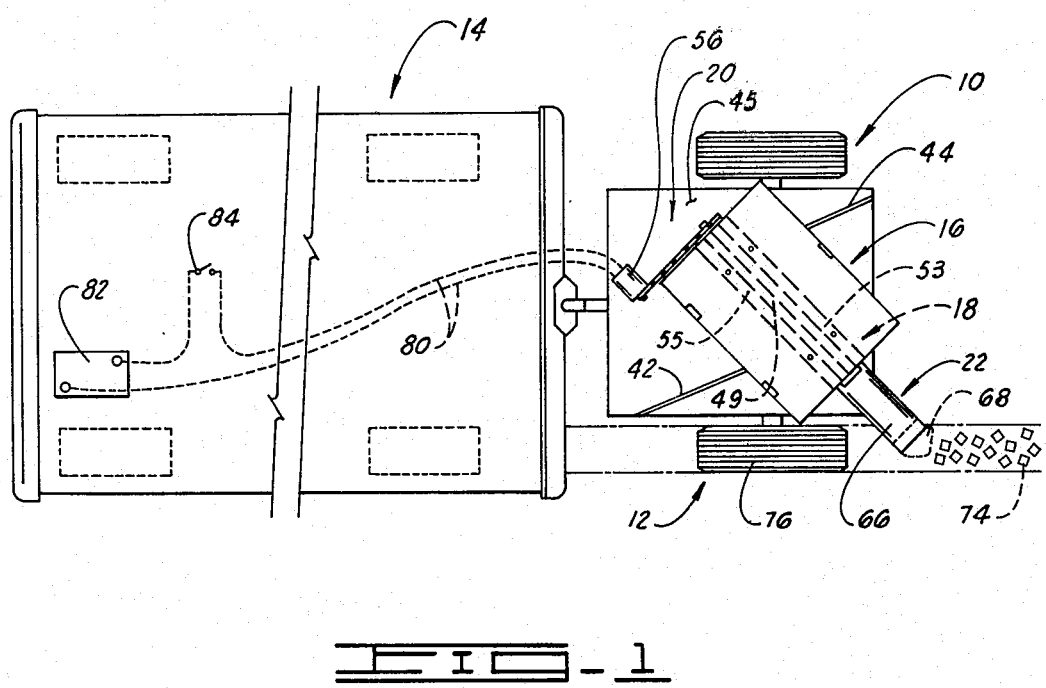
FIG. 1 is a top plan view of the dispenser apparatus mounted on a trailer with the trailer being connected behind a towing vehicle with portions shown in dashed lines for clarity, wherein the towing vehicle is shown shortened with the wheels thereof shown in dotted lines and the track of a wheel on the discharge side of the dispenser shown in dashed lines.
Figure 2:
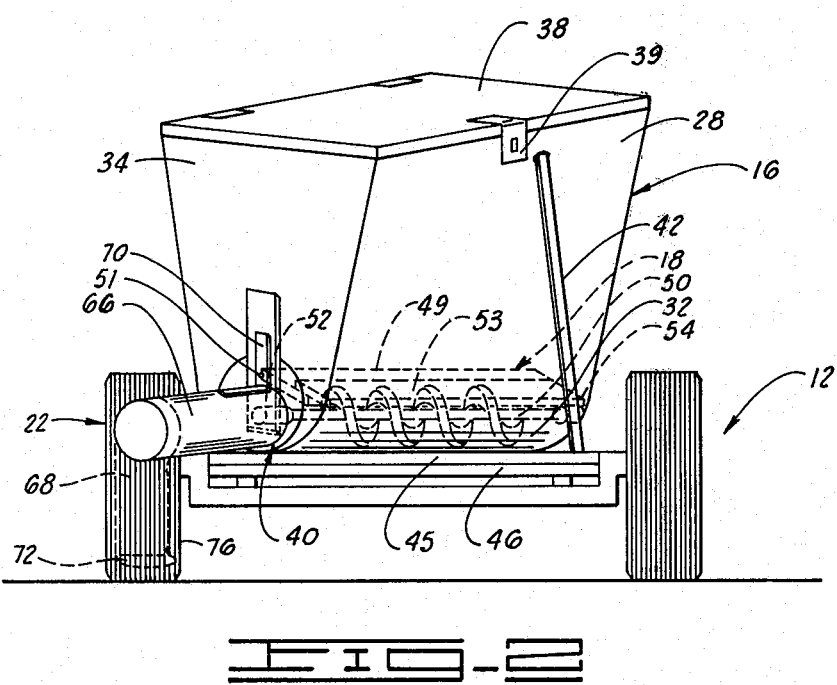
FIG. 2 is a rear elevation view of the dispenser apparatus mounted on the trailer with the auger apparatus shown in dotted lines.
Figure 3:
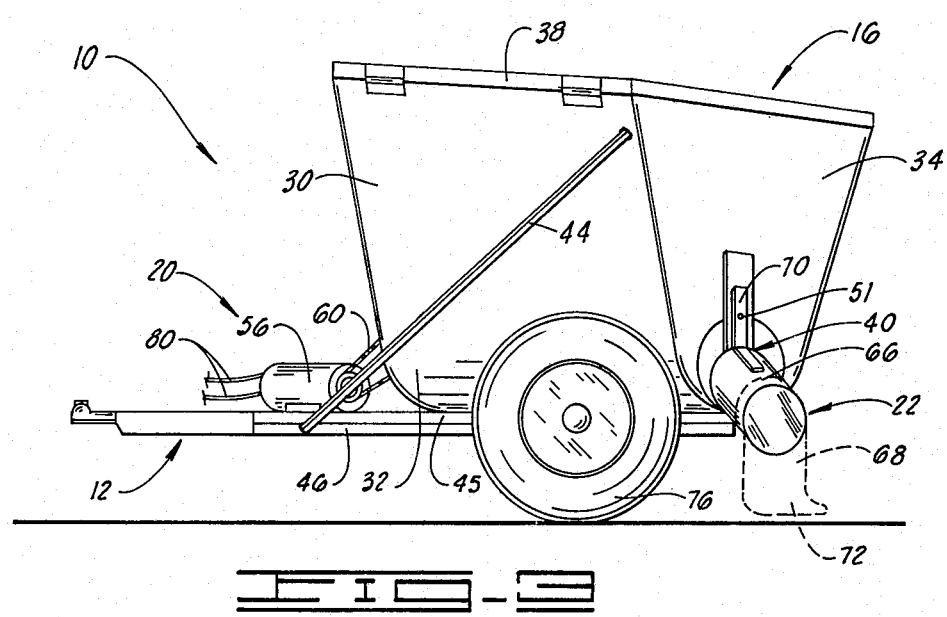
FIG. 3 is a side elevation view of the trailer and dispenser apparatus, taken from the discharge side of the dispenser and with the end portion of the discharge conduit shown in dashed lines for clarity.
Figure 4:
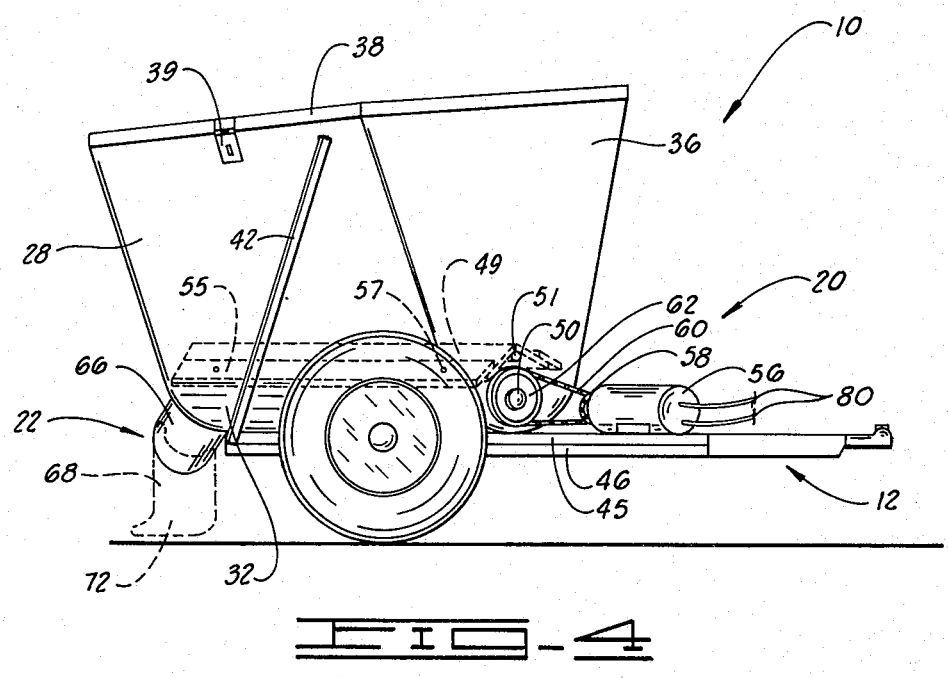
FIG. 4 is a side elevation view of the trailer and dispenser apparatus taken from the side opposite of the view of FIG. 3, with portions thereof shown in dotted lines for clarity.

The following is a discussion and description of preferred specific embodiments of the range pellet or cube dispensing apparatus of this invention, such being made with reference to the drawings, whereupon the same reference numerals are used to indicate the same or similar parts and/or structures. It is to be understood that such discussion and description is not to unduly limit the scope of the invention.

DESCRIPTION OF PREFERRED EMBODIMENTS

Referring to the drawings in detail and in particular to FIG. 1, a range pellet or cube dispenser of this invention, indicated at 10, is shown mounted on a trailer 12 with the trailer connected behind a towing vehicle 14. The dispenser apparatus 12 includes a hopper 16 with an auger apparatus 18 mounted therein and driven by a powering device 20, and a discharge conduit indicated generally at 22 mounted with the hopper outlet and extending therefrom.

The hopper 16 is elongated in its longitudinal direction and having the auger 18 operably mounted in the bottom thereof. FIGS. 1–4 show in detail the structure of the hopper 16, the auger 18, the powering device 20, and the discharge conduit 22. The hopper 16 has generally cross-sectionally V-shape with upright sidewalls 28 and 30, spaced substantially apart on the upper portion and joined in a rounded or arcuate portion 32 on their bottom or lower end portion. Hopper end walls 34 and 36 are joined with the hopper sidewalls 28 and 30. A top member 38 is hingedly mounted with the hopper sidewall 30 for enclosing the cavity of the hopper 16. A latch 39 is provided as shown for securing the top member 38 on the hopper 16. The hopper outlet is an aperture indicated generally at 40 through the hopper end wall 34. Braces 42 and 44 are provided to support the hopper 16 in the upright position as shown on a platform 45 mounted on the bed 46 of the trailer 12.

The auger 18 is preferably a spiral flighted screw type auger having the shaft thereof, 50, rotatably mounted in the cavity of the hopper 16 by mounts 52 and 54 on the hopper end walls 34 and 36, respectively. The auger 18 is mounted in the hopper's lower rounded portion 32. Mount 52 supporting the discharge end portion of the auger shaft 50 extends into the hopper outlet 40. The auger shaft 50 extends through the hopper end wall 36 and it has its end portion connected with the powering device 20 for rotation of same. The auger apparatus 18 preferably includes a shield structure above the auger flighting to guide material correctly into the auger for movement. The shield has an inverted V-shaped member 49 vertically adjustably attached on its ends by fasteners 51 to the hopper end walls 34 and 36 with adjustably mounted panels 53 and 55 on opposite sides thereof. The inverted V-shaped member 49 supports the panels 53 and 55 above the auger flighting as shown, with the panels 53 and 55 being adjustably mounted by fasteners 57 to adjust the spacing between their outer edges and the hopper sidewalls 28 and 30. Vertical adjustment of the shield structure and lateral adjustment of the panels 53 and 55 adjusts the auger apparatus 18 to operate properly for use in handling feed in cube form, smaller pellet form or grain as desired. The powering device 20 includes an electric motor 56 mounted on the platform 45 having a sprocket 58 mounted on the drive shaft thereof and connected by a chain 60 and a larger second sprocket 62 attached to the end of the auger shaft 50. The electric motor 56 can be connected with the electrical system of the towing vehicle 14 as will be described hereinafter. Discharge from the auger 18 is directly through the hopper outlet 40 into the discharge conduit 22. The auger 18 at the discharge end thereof is supported by the mount 52 which extends into the hopper outlet aperture.

The discharge conduit 22 is rigidly attached to the hopper end wall 34 at the hopper outlet 40 and includes a rigid portion 66 and a flexible outlet end portion 68. The discharge conduit rigid portion 66 has its inlet end rigidly secured to the hopper end wall 34 and supported by a brace member 70 as shown. The rigid portion 66 of the discharge conduit 22 is preferably generally downwardly angularly disposed with its outlet end portion lower than its inlet end portion, as shown in the drawings. The flexible conduit portion 68 of the dispensing conduit 22 is secured to the outlet end portion of the rigid conduit portion 66 and extends downward therefrom having its outlet end 72 terminating in close proximity to the ground level as shown in the drawings. With the dispenser apparatus 10 mounted on the trailer 12 the outlet end 72 of the flexible conduit portion 68 is preferably spaced slightly above the ground. When the trailer 12 is pulled over the ground and the ground is covered with snow, pellets will be dropped from the conduit outlet 72 into a track in the snow formed by the wheel 76. The wheel track is indicated at 74 in FIG. 1. It is to be noted that the dispenser 10 can be used without the flexible conduit portion 68 on the outlet end portion of the discharge conduit 22 since the outlet end of the rigid conduit portion 66 is generally positioned over the track of the wheel 76; in such use the rigid conduit portion 66 is downwardly and rearwardly directed so that the material will fall neatly into the track of the wheel. Preferred structure of the dispenser apparatus 10 includes the flexible conduit portion 68. In practice it has been found that a segment of a pneumatic wheel inner tube can be used as the flexible conduit portion 68. The generally curved shape of such an innertube used as the flexible conduit portion is advantageous in that it can be positioned so the outlet end portion of such will drag on the ground with the outlet 72 opening rearwardly when the dispenser 10 is in use. When the dispenser is not in use the flexible conduit portion 68 can be folded to an out of the way position and tied closed with twine or the like to seal the hopper outlet if desired.

Powering of the auger 18 is accomplished by the powering device 20 which preferably includes the electric motor 56. The electric motor 56 can be connected with the electrical circuit of the towing vehicle 14 as shown in FIG. 1. A pair of wires 80 connect the motor 56 with the vehicle's battery 82. A switch 84 is provided in one of the wires 80 to control on and off operation of the motor 56. It is to be noted that a hydraulic motor or other suitable power source can be substituted for the electric motor 56. When a hydraulic motor is used it can be powered by the hydraulic system of a towing vehicle where the vehicle is equipped for remotely operating hydraulically powered implements or the like. The motor 56 is connected by the chain drive to rotate the auger shaft 50 for moving material through the bottom portion 32 of the hopper 16 and through the outlet 40. Obviously, the rotating speed of the auger 18 is governed by the motor and the drive apparatus. The optimum operating speed of the auger to some extent will depend upon the particular material being dispensed from the device. For example, small pellets and bulk grain may be dispensed at one rate while larger cubes may be dispensed at another rate. The rate at which material is discharged by the dispensing device 10 must be coordinated with the forward speed of the vehicle so the desired quantity of feed is dropped in the track. When the motor 56 is a direct current electric motor, as is preferred, the speed of the motor can be varied by changing the power input to the motor as is well known in the art.

The hopper 16, motor 56, and braces 42 and 44 are attached to the platform 45 which is removably mountable with the trailer 12. In this construction the dispenser can be removably mounted as a unit with the trailer 14. The platform 88 can be removably attached to the structure of the trailer by bolts or other suitable fasteners. In removably mounting the dispenser apparatus 10 with the trailer 12, it allows the trailer to be used for other purposes when not needed for feeding cattle. Also, the dispenser apparatus 10 can be carried by vehicles other than truck 12; for example, it can be placed on the bed of a truck and driven through the field with the discharge of the conduit 22 being into the track of a rear wheel of the truck.

In the manufacture of the range pellet or cube dispensing apparatus of this invention, it is obvious that such can be easily constructed to achieve the end product. In practice it has been found that the structure can be assembled by using parts of obsolete or discarded vehicles and agricultural machines; for example, the hopper structure 16 has been formed from the roof and side portions of an automobile, the auger 18 and chain and sprocket apparatus has been taken from an obsolete combine, and the motor 56 is a used automotive type starter motor. In the manufacture of the structure of this invention, it is anticipated that the structure of this invention can be constructed from similar materials on a regular basis; however, such can also be constructed by using other suitable equivalents if desired.

In the use and operation of the range pellet or cube dispensing apparatus of this invention, it is seen that same provides a simple and efficient feed dispensing apparatus for the feeding cattle on the range when there is snow cover on the ground. The dispensing apparatus can be mounted on a trailer and pulled through the field by a suitable towing vehicle and powered remotely from the towing vehicle to dispense feed material into the track of the trailer. Use of the dispensing apparatus of this invention provides for efficient feeding of cattle on the range during the winter when snow is on the ground because it drops the feed directly into a wheel track in the snow which prevents the wind from blowing same.

As will become apparent from the foregoing description of the applicant's range pellet or cube dispensing apparatus, relatively inexpensive and simple means has been provided to dispense cattle feed in the field onto the ground. The structure is economical to manufacture, simple to use, and can be used during periods of harsh winter weather when it is ncessary to feed cattle in the field with snow cover on the ground to drop the feed into the track of the towing vehicle for easy access by the cattle.

While the invention has been described in conjunction with preferred specific embodiments thereof, it will be understood that this description is intended to illustrate and not to limit the scope of the invention, which is defined by the following claims.

I claim:

1. A feed dispenser means, comprising:
   a. a hopper mounted on a wheeled vehicle between the wheels thereof and generally central of said wheels, said hopper having the outlet on a lower portion thereof,
   b. auger means mounted in a lower portion of said hopper operable to move material when therein to said outlet, said auger means being mounted in a transverse and angular position relative to the normal forward direction of motion of said vehicle,
   c. powering means for said auger means operably connected to said auger means, and
   d. discharge conduit means having the inlet thereof mounted in communication with said hopper outlet and having the outlet opening in proximity to the rear of a wheel to one side of said vehicle, to in operation discharge material into a track of said wheeled vehicle at the rear of said vehicle, said hopper has tapered sidewalls in said lower portion adjacent to said auger means, said discharge conduit has a rigid conduit portion secured to said hopper outlet and a flexible conduit end portion secured to said rigid portion, said flexible conduit portion terminating in close proximity to ground level to in use discharge feed material in close proximity to ground level into a track of said wheeled vehicle, said auger means has a shaft rotatably mounted in said lower portion of said hopper with spiral flighting secured on said shaft, said powering means has a motor mounted on said wheeled vehicle and rotatably connected with said shaft, said hopper is generally rounded in cross-section in its bottom portion and has upwardly extending divergent sidewalls having said auger means extending longitudinally therethrough in said bottom thereof between said sidewalls, said hopper has end walls secured to said sidewalls on opposite ends thereof, said outlet being through one of said end walls, said flexible conduit end portion has a conduit closure means to close said flexible conduit end portion when said feed dispenser means is not in use, said rigid conduit portion extends from said hopper outlet in line with said auger means to a point generally vertically disposed above a track of said vehicle when in use, said flexible conduit end portion extends generally vertically downward from said rigid conduit portion and additionally including a shield member having a structure defined generally as in inverted V, said shield member being situated above said auger means to guide material correctly into same for movement, fastener means attached to the ends of said shield member, said V-shaped member being vertically adjustably attached on its ends by said fastener means to said hopper end walls.

2. The feed dispenser means of claim 1 additionally including a pair of adjustably mounted panels attached to said shield.

3. The feed dispenser means of claim 2 wherein each of said adjustably mounted panels are situated on opposite sides of said shield with respect to the other.

* * * * *